United States Patent
N

(10) Patent No.: US 11,562,872 B2
(45) Date of Patent: *Jan. 24, 2023

(54) CIRCUIT INTERRUPTER FOR DETECTING BREAKER FAULT CONDITIONS AND INTERRUPTING AN ELECTRIC CURRENT

(71) Applicant: ABB Schweiz AG, Baden (CH)

(72) Inventor: Chandrashekar N, Hyderabad (IN)

(73) Assignee: ABB Schweiz AG, Baden (CH)

( * ) Notice: Subject to any disclaimer, the term of this patent is extended or adjusted under 35 U.S.C. 154(b) by 82 days.

This patent is subject to a terminal disclaimer.

(21) Appl. No.: 17/022,155

(22) Filed: Sep. 16, 2020

(65) Prior Publication Data

US 2022/0084769 A1 Mar. 17, 2022

(51) Int. Cl.
*H01H 71/24* (2006.01)
*H01H 71/12* (2006.01)
*H02H 3/24* (2006.01)

(52) U.S. Cl.
CPC ...... *H01H 71/2454* (2013.01); *H01H 71/125* (2013.01); *H02H 3/24* (2013.01)

(58) Field of Classification Search
CPC ........ H02H 1/0007; H02H 3/04; H02H 3/044; H02H 3/24; H01H 71/125; H01H 71/2454; H01H 9/0005
See application file for complete search history.

(56) References Cited

U.S. PATENT DOCUMENTS

| | | | | |
|---|---|---|---|---|
| 5,757,598 A | * | 5/1998 | Aromin | H01H 47/04 361/42 |
| 11,196,242 B1 | * | 12/2021 | N | H02H 3/04 |
| 2008/0304190 A1 | * | 12/2008 | Bax | H02H 3/347 361/42 |
| 2019/0115748 A1 | * | 4/2019 | Li | H01R 13/713 |
| 2020/0285780 A1 | * | 9/2020 | Rajpathak | G06F 21/81 |
| 2021/0111554 A1 | * | 4/2021 | Li | H02H 7/20 |
| 2021/0313796 A1 | * | 10/2021 | Li | H02H 1/0007 |

* cited by examiner

*Primary Examiner* — Jared Fureman
*Assistant Examiner* — Nicolas Bellido
(74) *Attorney, Agent, or Firm* — Leydig, Voit & Mayer, Ltd.

(57) ABSTRACT

A circuit interrupter (100) for interrupting an electric current in an electrical line is disclosed. The circuit interrupter (100) includes a controller (102) for detecting a breaker fault condition. The controller (102) is connected to a first semiconductor switch (114) for energizing a solenoid (104) to trip a circuit breaker on detection of the breaker fault condition, wherein a winding of the solenoid (104) is energized to trip the circuit breaker, and wherein the solenoid (104) is configured with a center tap in the winding, such that there are two parts (106, 108) in the winding separated by the center tap. Further, upon detection of an open condition in a part of the winding, the controller (102) is configured to provide a trip signal to the circuit breaker using the other part of the winding.

9 Claims, 3 Drawing Sheets

CIRCUIT INTERRUPTER FOR DETECTING BREAKER FAULT CONDITIONS AND INTERRUPTING AN ELECTRIC CURRENT

TECHNICAL FIELD

This disclosure relates to ground fault circuit interrupters and, more particularly, a circuit interrupter for interrupting an electric current in an electrical line connecting an electrical supply to a load on detection of a breaker fault condition by the circuit interrupter.

BACKGROUND

Fault interrupting devices are designed to trip in response to detection of a fault condition in an electric circuit. Ground fault circuit interrupters (GFCIs) are a type of electronic circuit breaker that may be used in some electrical systems to protect the electrical circuit from ground faults. However, when a solenoid that activates mechanical trip action is open circuited, the GFCI doesn't trip to disconnect or interrupt the power. In such cases, the GFCI may not be able to ensure protection against the ground fault. The GFCI follows the standard UL-943 set up by guarantor laboratory (Underwriter's Laboratory (UL)). The UL-943 is being revised to make detection of the open condition in the solenoid mandatory.

To detect the open condition in the solenoid, voltage across the solenoid needs to be measured. Conventional GFCI don't have provision to measure the voltage across the solenoid. To that end, some conventional methods may use an external controller that is connected with the GFCI to measure the voltage across the solenoid. However, the design of such systems is complex and the configuration suffers from high time delay in detecting the open condition in the solenoid. Further, the external controller provides inaccurate measurements of parameters resulting in false detection of the open condition in the solenoid. Furthermore, the external controller is application specific thereby ensuring a configuration that is static. As a result, the controller doesn't allow modification of its operating parameters according to different fault conditions and GFCIs, for detection of the open condition in the solenoid.

Accordingly, there is a need to develop a system that provides a controller integrated with the GFCI and that can accurately detect the open condition in the solenoid during different fault conditions.

SUMMARY

It is an object of some embodiments to trip a circuit breaker when the circuit breaker is unable to provide a ground fault or grounded-neutral fault protection. Some embodiments are based on realization that a center-tapped solenoid can be used to trip the circuit breaker when the solenoid is open circuited. Additionally or alternatively, it is object of an embodiment to provide a controller for detecting breaker fault condition and pole missing condition. In particular, it is object of an embodiment to provide a microcontroller based controller for detecting the breaker fault condition and the pole missing condition.

Accordingly, embodiments disclosed herein provide a circuit interrupter for interrupting an electric current in an electrical line connecting an electrical supply to a load on detection of a breaker fault condition by the circuit interrupter, the circuit interrupter being connected between an electrical supply side 122 and a load side 124, the circuit interrupter having a controller for detecting the breaker fault condition, the controller being connected to a first semiconductor switch for energizing a solenoid to trip a circuit breaker on detection of the breaker fault condition, wherein a winding of the solenoid is energized to trip the circuit breaker, wherein the solenoid is configured with a center tap in the winding, such that there are two parts in the winding separated by the center tap, and wherein, on detection of an open condition in a part of the winding, the controller is configured to provide a trip signal to the circuit breaker 126 using the other part of the winding.

According to an embodiment, the controller is a microcontroller based circuit, and the breaker fault condition corresponds to the open condition in one of the parts of the winding of the solenoid.

According to an embodiment, the controller is configured to detect the open condition in upper half of the winding of the solenoid, based on a voltage at the center tap being less than a first voltage threshold.

According to an embodiment, the controller is further configured to trigger, upon the detection of the open condition in the upper half, the first semiconductor switch and a second semiconductor switch for issuing the trip signal.

According to another embodiment, the controller is further configured to detect the open condition in lower half of the winding of the solenoid, based on a voltage at bottom node being less than a second voltage threshold.

According to some embodiments, the controller is further configured to trigger, upon the detection of the open condition in the lower half, the first semiconductor switch for issuing the trip signal.

According to some embodiments, the controller is further configured to detect pole missing condition, based on a voltage at top node being less than a rectified voltage threshold.

According to some embodiments, the controller is further configured to trigger, upon the detection of the pole missing condition, a silicon controlled rectifier (SCR) for issuing the trip signal.

According to some embodiments, the controller is configured to protect the SCR from a short circuit current during the breaker fault condition.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION OF THE DRAWINGS

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
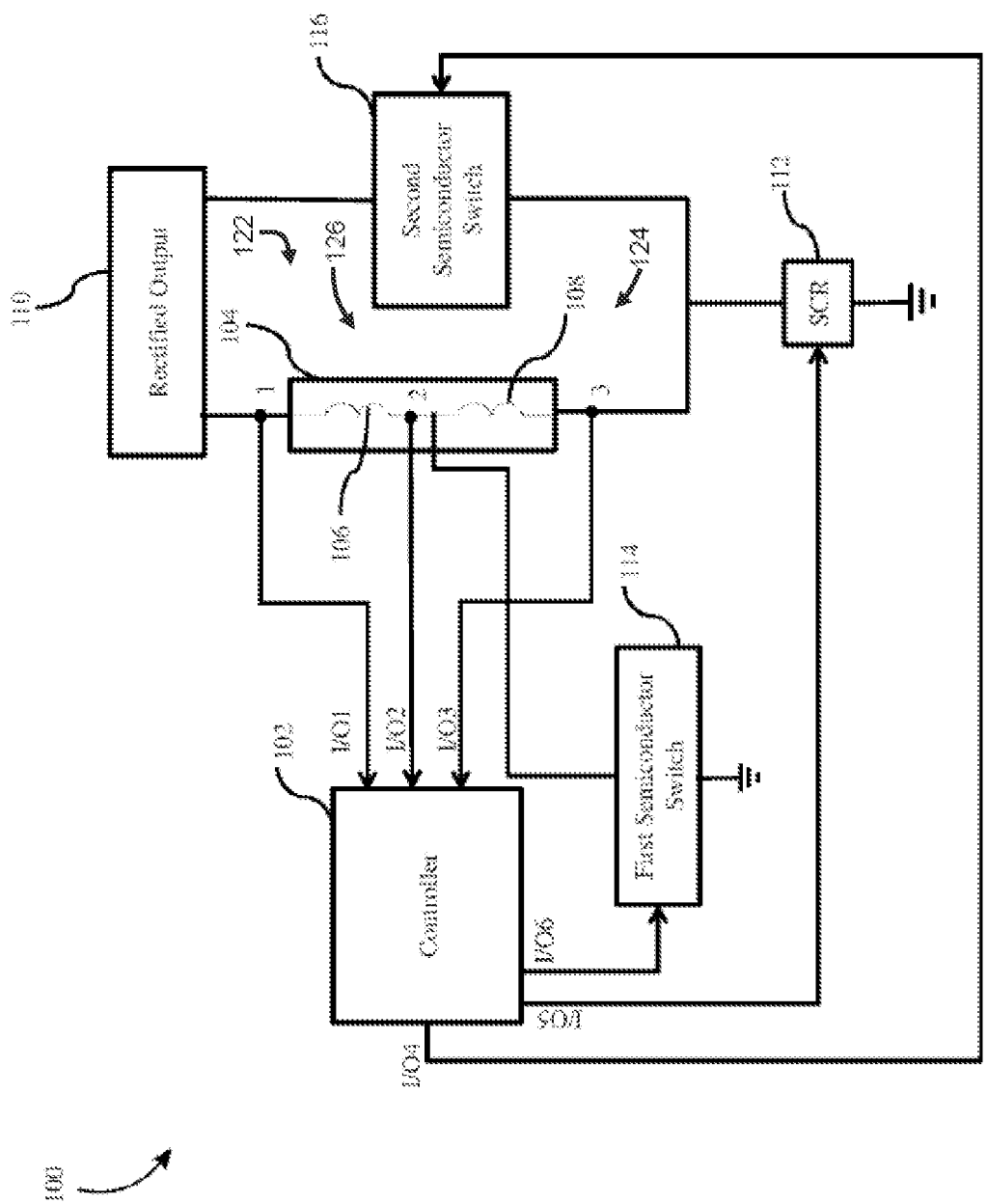
FIG. 1 shows a block diagram of a circuit interrupter for interrupting an electric current in an electrical line, according to some embodiments.

FIG. 1 shows a block diagram of a circuit interrupter 100 for interrupting an electric current in an electrical line, according to some embodiments. The circuit interrupter 100 comprises a controller 102, a center-tapped solenoid 104, a silicon controlled rectifier (SCR) 112, a first semiconductor switch 114, and a second semiconductor switch 116. A solenoid is a coil of wire usually in cylindrical form that when carrying current acts like a magnet so that a movable core is drawn into the coil when the current flows. In some embodiments, the solenoid is used as a switch or activates a mechanical trip action. The center-tapped solenoid 104 is formed by tapping coil/winding of the solenoid at its center. As a result of the center tapping, the center-tapped solenoid 104 includes two parts, namely, an upper half 106 and a lower half 108.

Further, the center-tapped solenoid 104 includes three ends represented by 1, 2, and 3, respectively. The end 1, end 2, and end 3 may be alternatively referred as top node, mid node, and bottom node, respectively. The end 2 corresponds to a point of the winding at which the solenoid is center-tapped. The end 1 is connected to an output line of a rectifier unit providing rectified output 110. The rectifier unit is connected to lines that are connected to an electric supply which is configured to supply electrical energy to a load. In an embodiment, the rectified output 110 in a one pole design corresponds to bridge rectifier output that corresponds to a full wave rectified waveform. In an alternate embodiment, the rectified output 110 in a two pole design corresponds to two half wave rectified waveforms that can be combined together to form the full wave rectified waveform.

The load may be resistive load, inductive load, capacitive load, or combination thereof. In some embodiments, the lines correspond to a hot conductor and a neutral of an electric circuit. Rating of the electric supply ranges from voltage in order of few volts to voltage in order of kV. For example, the rating of the electric supply may be alternating current (AC) 120 V 60 Hz, or to 240V 50 Hz. The end 3 is connected to the rectified line voltage 110, via the second semiconductor switch 116. The SCR 112 is configured to activate the center-tapped solenoid 104. The winding of the center-tapped solenoid 104 between the end 1 and the end 2 corresponds to the upper half 106. Likewise, the winding of the center-tapped solenoid 104 between the end 2 and the end 3 corresponds to the lower half 108. Hereinafter, the 'center-tapped solenoid' and 'solenoid' are used interchangeably and would mean the same.

The controller 102 is a microcontroller based circuit. The controller 102 includes one or more input/output pins (I/O) for connecting the controller 102 with external components. For example, the controller 102 includes six I/O pins, namely, I/O1, I/O2, I/O3, I/O4, I/O5, and I/O6. The pins I/O1, I/O2, and I/O3 are connected to end 1, end 2, and end 3, respectively. According to an embodiment, the pins I/O1, I/O2, and I/O3 are connected to end 1, end 2, and end 3, respectively, through corresponding voltage divider circuits. To that end, the pins I/O1, I/O2 and I/O3 of controller 102 are fed with voltages at end 1, end 2, and end 3, respectively. The pins I/O1, I/O2 and I/O3 of the controller 102 track the corresponding voltages continuously and detect the solenoid 104 presence/absence. In particular, the controller 102 detects a breaker fault condition. The breaker fault condition corresponds to an open condition in the upper half 106 or the lower half 108 of the solenoid 104. The open condition may refer to open circuit condition due to a cut in the solenoid winding. Further, the controller 102 is configured to detect pole missing condition based on the voltage at the end 1. According to an embodiment, the pole missing condition may refer to missing of one pole in the two pole design. When a pole is missing in the two pole design, the voltages at the pins I/O1, I/O2, and I/O3 correspond to the half-wave rectified waveform.

Further, the pin I/O6 and the pin I/O4 of the controller 102 are connected to the first semiconductor switch 114 and the second semiconductor switch 116, respectively. The pin I/O5 of the controller 102 is connected to the SCR 112. The first semiconductor switch 114 and the second semiconductor switch 116 correspond to any gate controlled device such as, but not limited to, silicon controlled rectifier, bipolar junction transistor, and field effect transistor.

The controller 102 is configured to detect the breaker fault condition. Further, the controller 102 is configured to provide a trip signal to a circuit breaker, upon detection of the breaker fault condition. The trip signal is passed through the center-tap of the solenoid 104. According to an embodiment, the controller 102 is configured to trigger, upon the detection of the open condition in the part 106 (i.e. the upper half), the first semiconductor switch 114 and the second semiconductor switch 116 for issuing the trip signal. The controller 102 is further configured to trigger, upon the detection of the open condition in the part 108 (i.e., the lower half), the first semiconductor switch 114 for issuing the trip signal. In other words, the controller 102 is connected to the first semiconductor switch 114 for energizing the solenoid 104 to trip the circuit breaker on detection of the breaker fault condition. Additionally, the controller 102 is configured to trigger, upon detection of the pole missing condition, the SCR 112 for issuing the trip signal.

Figure 2A:
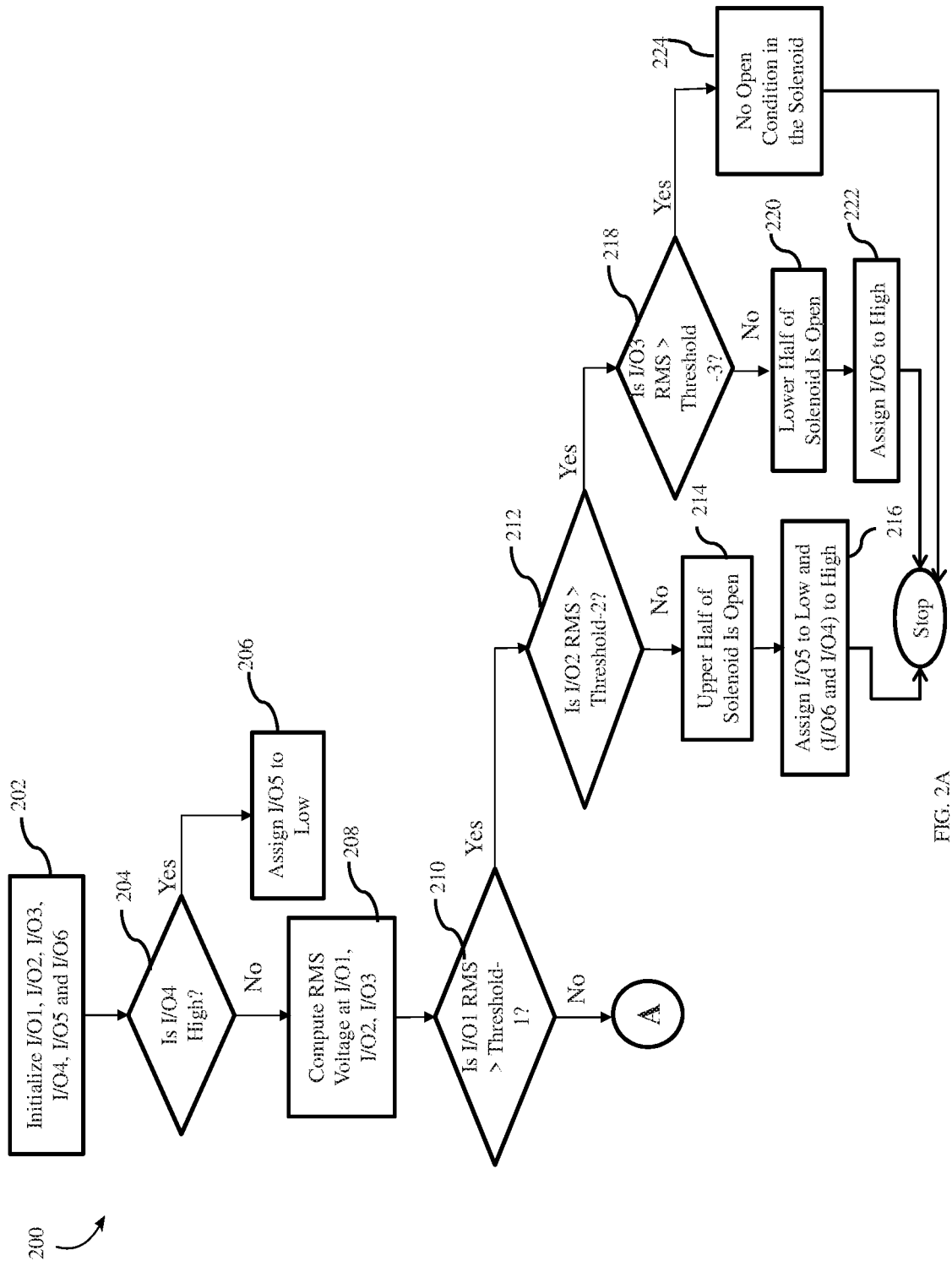
FIGS. 2A and 2B show a flow chart for detecting breaker fault conditions and issuing a trip signal, according to some embodiments.
Figure 2B:
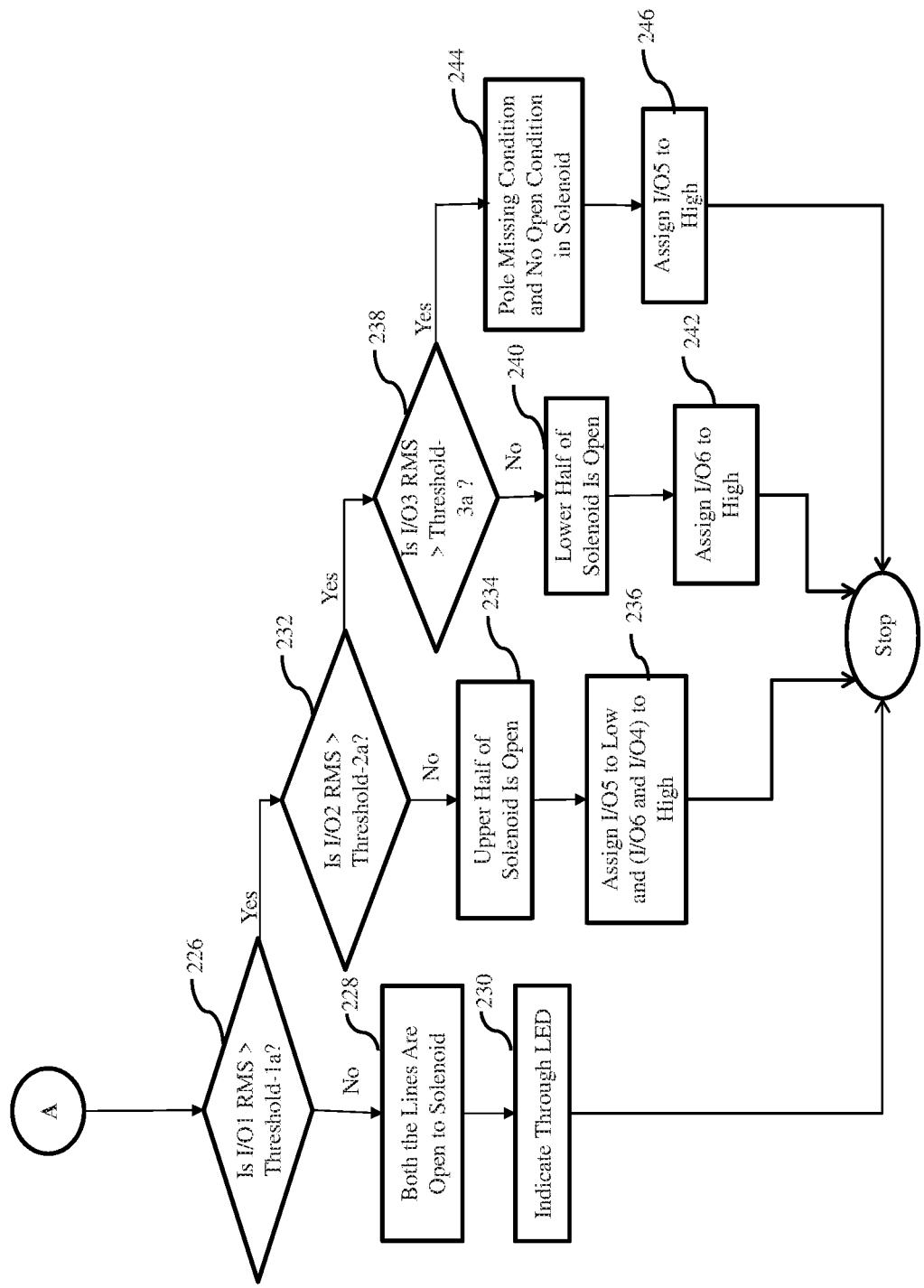

FIGS. 2A and 2B show a flow chart 200 for detecting the breaker fault conditions and issuing the trip signal, according to some embodiments. At 202, the controller 102 is configured to initialize the pins I/O1, I/O2, I/O3, I/O4, I/O5, and I/O6. At 204, the controller 102 checks if the pin I/O4 is high. If the pin I/O4 is high, then the controller 102 assigns the pin I/O5 to low, as shown at 206. If the pin I/O4 is not high, then the controller 102 computes root mean square (RMS) voltage at the pins I/O1, I/O2, and I/O3, as shown at 208. In other words, the controller 102 computes RMS voltage values at end 1, end 2, and end 3 of the solenoid 104.

At 210, the controller 102 compares the RMS voltage at the pin I/O1 with a threshold-1. In particular, the controller 102 checks if the RMS voltage at the pin I/O1 is greater than the threshold-1. The threshold-1 may be referred as a rectified voltage threshold. In an alternate embodiment, the threshold-1 corresponds to RMS voltage corresponding to full wave rectification at end 1 of the solenoid 104. If the RMS voltage at the pin I/O1 is greater than the threshold-1, then, at 212, the controller 102 checks if the RMS voltage at the pin I/O2 is greater than the threshold-2. The threshold-2 may be referred as a first voltage threshold. In an embodiment, the threshold-2 corresponds to RMS voltage corresponding to the full wave rectification at end 2 of the solenoid 104. If the RMS voltage at the pin I/O2 is less than the threshold-2, then it is inferred that the upper half 106 of the solenoid 104 is open, as shown at 214. Further, at 216, the controller 102 assigns the pin I/O5 to low, and the pins I/O6 and I/O4 to high for issuing the trip signal. In other words, the first semiconductor switch 114 and the second semiconductor switch 116 are triggered. As a result, the lower half 108 of the solenoid 104 is activated for issuing the trip signal to trip the circuit breaker. Therefore, even when the upper half 106 of the solenoid 104 is open, the other part i.e. the lower half 108 of the solenoid 104 is still intact and can be used to trip the circuit breaker.

If the RMS voltage at the pin I/O2 is greater than the threshold-2, then, at 218, the controller 102 checks if the RMS voltage at the pin I/O3 is greater than the threshold-3. The threshold-3 may be referred as a second voltage threshold. In an embodiment, the threshold-3 corresponds to RMS voltage corresponding to the full wave rectification at end 3 of the solenoid 104. If the RMS voltage at the pin I/O3 is less than the threshold-3, then it is inferred that the lower half 108 of the solenoid 104 is open, as shown at 220. Further, at 222, the controller 102 assigns the pin I/O6 to high for issuing the trip signal. In other words, the first semiconductor switch 114 is triggered. As a result, the upper half 106 of the solenoid 104 is activated for issuing the trip signal to trip the circuit breaker. Therefore, even when the lower half 108 solenoid 104 is open, the other part i.e. the upper half 106 of the solenoid 104 is still intact and can be used to trip the circuit breaker.

If the RMS voltage at the pin I/O3 is greater than the threshold-3, then it is inferred that no open condition in the solenoid 104, as shown at 224.

If the RMS voltage at the pin I/O1 is less than the threshold-1, then, at 226, the controller 102 checks if the RMS voltage at the pin I/O1 is greater than the threshold-1a. According to an embodiment, the threshold-1a corresponds to RMS voltage corresponding to half wave rectification at end 1 of the solenoid 104. If the RMS voltage at the pin I/O1 is greater than the threshold-1a, then, at 232, the controller 102 checks if the RMS voltage at the pin I/O2 is greater than the threshold-2a. In an embodiment, the threshold-2a corresponds to RMS voltage corresponding to the half wave rectification at end 2 of the solenoid 104. If the RMS voltage at the pin I/O2 is less than the threshold-2a, then it is inferred that the upper half 106 of the solenoid 104 is open, as shown at 234. Further, at 236, the controller 102 assigns the pin I/O5 to low, and the pins I/O6 and I/O4 to high for issuing the trip signal. In other words, the first semiconductor switch 114 and the second semiconductor switch 116 are triggered. As a result, the lower half 108 of the solenoid 104 is activated for issuing the trip signal to trip the circuit breaker.

If the RMS voltage at the pin I/O2 is greater than the threshold-2a, then, at 238, the controller 102 checks if the RMS voltage at the pin I/O3 is greater than the threshold-3a. In an embodiment, the threshold-3a corresponds to RMS voltage corresponding to the half wave rectification at end 3 of the solenoid 104. If the RMS voltage at the pin I/O3 is less than the threshold-3a, then it is inferred that the lower half 108 of the solenoid 104 is open, as shown at 240. Further, at 242, the controller 102 assigns the pin I/O6 to high for issuing the trip signal. In other words, the first semiconductor switch 114 is triggered. As a result, the upper half 106 of the solenoid 104 is activated for issuing the trip signal to trip the circuit breaker. Therefore, in the open circuited solenoid (open upper half/open lower half), one half of the solenoid 104 is still intact and can be used to trip the circuit breaker.

If the RMS voltage at the pin I/O3 is greater than the threshold-3a, then it is inferred that no open condition in the solenoid 104 and the pole missing condition exists, as shown at 244. Further, at 246, the controller 102 assigns the pin I/O5 to high. As a result, the SCR 112 is triggered for issuing the trip signal to trip the circuit breaker.

If the RMS voltage at the pin I/O1 is less than the threshold-1a, then it is inferred that both the lines are open to the solenoid 104, as shown at 228. Further, at 230, the controller 102 indicates such inference through a light emitting diode (LED).

To that end, the circuit interrupter 100 can be used to detect the breaker fault conditions and the pole missing condition, and, subsequently, trip the circuit breaker. As tripping the circuit breaker interrupts the power flow, reliable power and protection of load/electric circuit is ensured. Also, as only single solenoid (104) is used for tripping the circuit breaker, no backup or redundant component (such as additional solenoids) is introduced or required. Furthermore, the SCR 112 that activates the solenoid 104 is protected from carrying a short circuit current during the breaker fault condition.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

I claim:

1. A circuit interrupter (100) for interrupting an electric current in an electrical line connecting an electrical supply to a load on detection of a breaker fault condition by the circuit interrupter,
the circuit interrupter being connected between an electrical supply side and a load side,
the circuit interrupter having a controller (102) for detecting the breaker fault condition,
the controller (102) being connected to a first semiconductor switch (114) for energizing a solenoid (104) to trip a circuit breaker on detection of the breaker fault condition,
wherein a winding of the solenoid (104) is energized to trip the circuit breaker,
wherein the solenoid (104) is configured with a center tap (2) in the winding, such that there are two parts (106, 108) in the winding separated by the center tap (2), and
wherein, on detection of an open condition in a part of the winding, the controller (102) is configured to provide a trip signal to the circuit breaker using the other part of the winding.

2. The circuit interrupter (100) as claimed in claim 1, wherein the controller (102) is a microcontroller based circuit, and wherein the breaker fault condition corresponds to the open condition in one of the parts (106, 108) of the winding of the solenoid (104).

3. The circuit interrupter (100) as claimed in claim 1, wherein the controller (102) is configured to detect the open condition in the part (106) of the winding of the solenoid (104) based on a voltage at the center tap (2) being less than a first voltage threshold.

4. The circuit interrupter (100) as claimed in claim 3, wherein the controller (102) is further configured to trigger, upon the detection of the open condition in the part (106), the first semiconductor switch (114) and a second semiconductor switch (116) for issuing the trip signal.

5. The circuit interrupter (100) as claimed in claim 1, wherein the controller (102) is further configured to detect the open condition in the part (108) of the winding of the solenoid (104), based on a voltage at an end (3) of the winding being less than a second voltage threshold.

6. The circuit interrupter (100) as claimed in claim 5, wherein the controller (102) is further configured to trigger, upon the detection of the open condition in the part (108), the first semiconductor switch (114) for issuing the trip signal.

7. The circuit interrupter (100) as claimed in claim 1, wherein the controller (102) is further configured to detect a pole missing condition based on a voltage at an end (1) of the winding being less than a rectified voltage threshold.

8. The circuit interrupter (100) as claimed in claim 7, wherein the controller (102) is further configured to trigger, upon the detection of the pole missing condition, a silicon controlled rectifier (SCR) (112) for issuing the trip signal.

9. The circuit interrupter (100) as claimed in claim 8, wherein the controller (102) is configured to protect the SCR (112) from a short circuit current during the breaker fault condition.

* * * * *